Jan. 11, 1944.   W. W. CHESNUT   2,338,999
SPRING TIRE
Filed Aug. 19, 1942
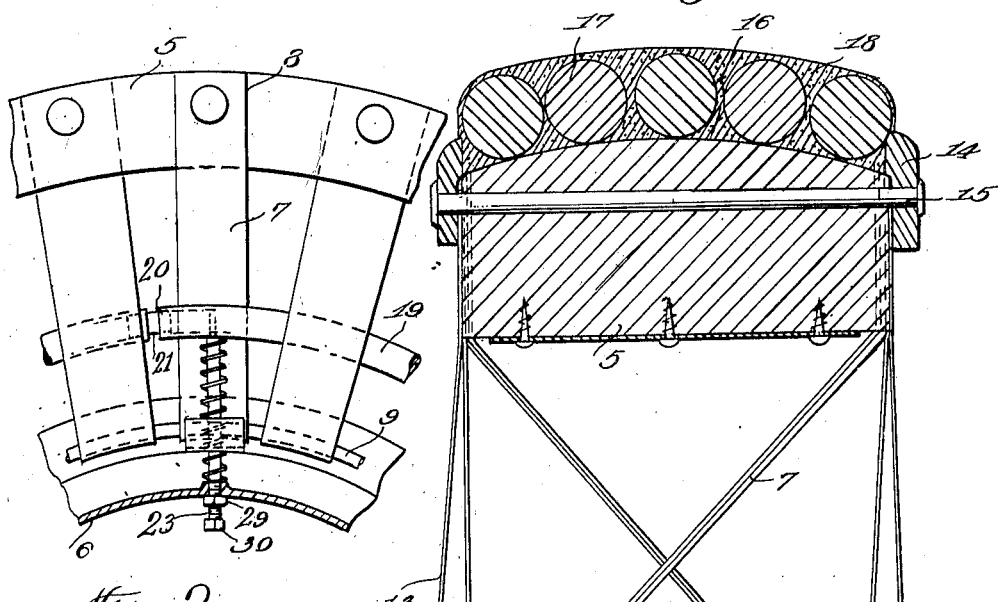
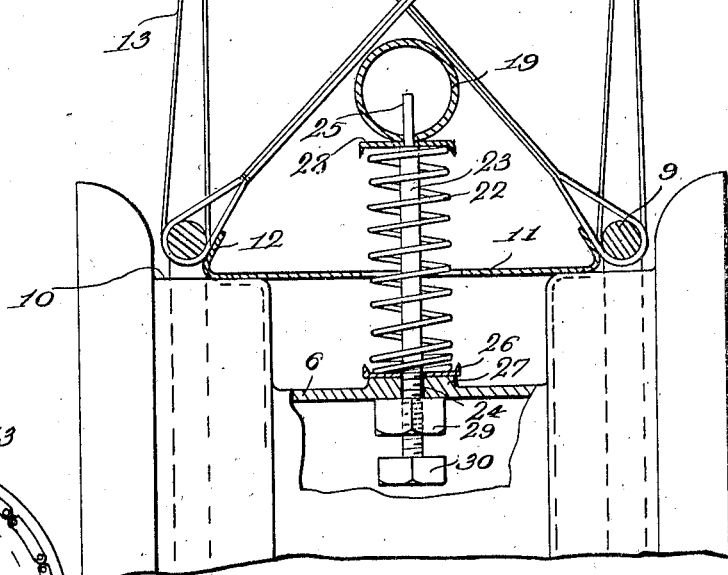
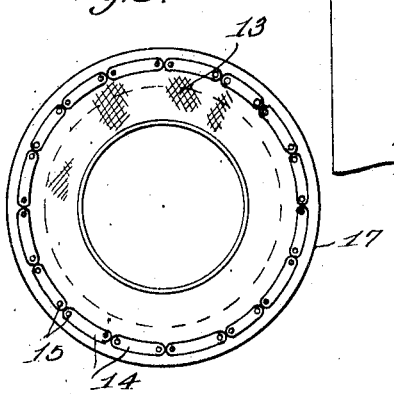
Inventor
William W. Chesnut
By Ralph Burch
Attorney Patented Jan. 11, 1944

2,338,999

UNITED STATES PATENT OFFICE 2,338,999

SPRING TIRE

William W. Chesnut, Yazoo City, Miss.

Application August 19, 1942, Serial No. 455,355

7 Claims. (Cl. 152—6)

This invention relates to tires for motor vehicles and the like and more particularly to a spring tire which does not depend upon air or rubber for its resiliency.

It is an object of the invention to construct a tire of flexible materials other than rubber which will resiliently and flexibly sustain a load so as to absorb the shocks imparted to the tire when traveling over the roads.

A further object of the invention resides in constructing a tire of the above character having adjustable means to control the degree of flexibility of the tire.

Another object of the invention resides in providing a tire of the above character which is strong and durable in construction, easy to repair, efficient and reliable in operation and inexpensive to manufacture.

Other objects and advantages of the invention will be apparent during the course of the following description.

In the accompanying drawing forming a part of this specification and in which like numerals are employed to designate like parts throughout the same, Fig. 1 is a vertical sectional view of the tire mounted on the rim of a wheel, Fig. 2 is a fragmentary side elevation of the tire with the side walls removed, and, Fig. 3 is a side elevation of the tire.

In the drawing wherein for the purpose of illustration I have shown a preferred embodiment of my invention, the numeral 5 denotes an annular wood felly of sufficient diameter to encircle a conventional rim 6 of a vehicle wheel in spaced relation of the periphery of the rim. The felly 5 is supported and held in spaced relation to the rim 6 by a series of web strips or cords 7 which have one end seated in recesses 8 formed in the sides of the felly. The web strips extend from the sides of the felly in a diagonal direction transversely of the tire and are looped around cable rings 9 supported on the shoulders 10 of the rim 6. Thus, it is seen the web strips extending from one side of the felly are disposed in crossed relation to the strips extending from the other side forming X-shaped flexible supporting and bracing means. The cable rings 9 are held in spaced apart relation by cross bars 11 having upturned ends 12 which abut against the rings and hold them securely against the shoulders 10. The side walls 13 of the tire are formed from a double layer of canvas which is looped around the rings 9 with its free ends attached to the sides of the felly by a series of metal plates 14 secured to the sides of the felly by bolts 15 passing transversely through the felly. The bolts extend through the side walls and the ends of the web strips 7, thus firmly anchoring the side walls and web strips to the felly. The canvas material forming the side walls may be coated with a suitable filler to add rigidity to the walls and yet permit flexing of the walls when the tire is in use.

The outer periphery of the felly is transversely curved, as at 16, and circumferentially encircling the outer periphery are a plurality of endless ropes 17 which are embedded in a suitable filler material 18 to form a tread surface for the felly. The metal plates 14 extend upwardly above the sides of the outer periphery of the felly, as shown in Fig. 1, and serve to retain the tread surface against lateral movement.

To provide for adjusting the tautness of the web strips to regulate the flexibility of the tire, an expansible tubular ring 19 is disposed below the intersecting point of the crossed webs and encircles the wheel rim. The ring 19 is split, as at 20, the split ends being connected by a slidable union 21 to permit expansion and contraction of the ring. The ring 19 is supported in spaced relation to the wheel rim by a series of expansion springs 22 disposed at spaced intervals around the rim. The tension of each spring is adjusted by a bolt 23 on which the spring is mounted. The bolt 23 is slidably mounted through an opening 24 in the rim and has a reduced outer end 25 slidably mounted through an opening in the ring 19. The inner end of the spring bears against a washer 26 seated on a boss 27 while the outer end bears against a washer 28 fixed on the bolt 23; so that upon longitudinal movement of the bolt the spring is contracted or permitted to expand. A nut 29 is threaded on the inner end of the bolt 23 between the bolt head 30 and underside of the wheel rim and by adjusting the nut 29 the bolt may be extended or retracted to adjust the tension of the spring, thereby expanding or contracting the ring 19 to increase or decrease the pressure of the ring against the web strips 7.

In use the tire may be readily substituted for the conventional rubber tire now commonly employed on motor vehicle wheels. It may be readily mounted on the conventional wheel rim by springing the cable rings 9 over the flanges of the rim until the rings 9 are seated upon the shoulders 10 of the rim. The web strips 7 normally support and hold the felly 5 in fixed spaced relation to the wheel rim but are capable of a slight flexing or yielding movement when the tire is in use. The rope rings forming the tread of the tire also have a certain degree of resiliency and provide excellent traction between the tire and roadway. When it is desired to decrease the degree of flexibility of the tire bolts 23 are turned to permit expansion of the springs 22 which expand the tubular ring 19 into pressing engagement with the web strips and increase their tautness. To increase the flexibility of the tire, the bolts 23 are adjusted to contract the springs and thereby reduce the pressure of the ring 19 against the web strips.

It is to be understood that the form of my invention herein shown and described is to be taken as a preferred example of the same and that certain changes in the shape, size and arrangement of the parts may be made without departing from the spirit of the invention or the scope of the subjoined claims.

Having thus described my invention, I claim:

1. A spring tire comprising an annular felly, spaced parallel rings of smaller diameter than said felly disposed in spaced concentric relation to the felly, flexible side walls extending between said rings and the sides of said felly, individual web strips extending diagonally between said felly and the inner periphery of the tire, and a tread surface covering the periphery of the felly.

2. A spring tire comprising an annular felly, spaced parallel rings of smaller diameter than said felly disposed in spaced concentric relation to the felly, flexible side walls extending between said rings and the sides of said felly, individual web strips extending from the sides of said felly in a diagonal direction towards the inner periphery of the tire and secured thereto, and a tread surface covering the periphery of the felly.

3. A spring tire comprising an annular felly, spaced rings of smaller diameter than said felly disposed in spaced concentric relation to the felly, flexible side walls extending between said rings and the sides of said felly, web strips extending diagonally between said felly and the inner periphery of the tire and means for adjusting the tautness of said web strips.

4. A spring tire comprising an annular felly, spaced parallel rings of smaller diameter than said felly disposed in spaced concentric relation to the felly, flexible side walls extending between said rings and the sides of said felly, individual web strips having one end attached to a side of said felly and their opposite end attached to a ring on the opposite side of the tire, and a tread surface on the outer periphery of said felly.

5. A spring tire comprising an annular felly, spaced parallel rings of smaller diameter than said felly disposed in spaced concentric relation to the felly, flexible side walls extending between said rings and the sides of said felly, web strips extending between the sides of said felly and said rings disposed in crossed relation, means for adjusting the tautness of said web strips, and a tread surface on the outer periphery of said felly.

6. A spring tire comprising an annular felly, spaced parallel rings of smaller diameter than said felly disposed in spaced concentric relation to the felly, flexible side walls extending between the sides of said felly and said rings, web strips extending diagonally in crossed relation between the sides of said felly and said rings, an expansible ring concentrically disposed in the center of the tire below the intersecting point of the crossed web strips, and means for expanding said expansible ring into engagement with said web strips to increase the tautness of said strips.

7. A spring tire comprising an annular felly, spaced rings of smaller diameter than said felly disposed in spaced concentric relation to the felly, web strips extending diagonally in crossed relation between said felly and the inner periphery of the tire, and an expansible ring concentrically disposed in the center of the tire below the intersecting point of the crossed web strips.

WILLIAM WESLEY CHESNUT.